US010296341B2

(12) United States Patent
Svendsen et al.

(10) Patent No.: US 10,296,341 B2
(45) Date of Patent: May 21, 2019

(54) LATEST PRODUCER TRACKING IN AN OUT-OF-ORDER PROCESSOR, AND APPLICATIONS THEREOF

(71) Applicant: ARM Finance Overseas Limited, Cambridge (GB)

(72) Inventors: Kjeld Svendsen, San Jose, CA (US); Xing Yu Jiang, Palo Alto, CA (US)

(73) Assignee: ARM Finance Overseas Limited, Cambridge (GB)

( * ) Notice: Subject to any disclaimer, the term of this patent is extended or adjusted under 35 U.S.C. 154(b) by 0 days.

(21) Appl. No.: 14/704,416

(22) Filed: May 5, 2015

(65) Prior Publication Data

US 2015/0234657 A1    Aug. 20, 2015

Related U.S. Application Data

(63) Continuation of application No. 11/485,960, filed on Jul. 14, 2006, now abandoned.

(51) Int. Cl.
*G06F 9/30* (2018.01)
*G06F 9/38* (2018.01)

(52) U.S. Cl.
CPC ........ *G06F 9/30141* (2013.01); *G06F 9/3012* (2013.01); *G06F 9/3017* (2013.01); *G06F 9/30149* (2013.01); *G06F 9/30174* (2013.01); *G06F 9/384* (2013.01); *G06F 9/3857* (2013.01)

(58) Field of Classification Search
None
See application file for complete search history.

(56) References Cited

U.S. PATENT DOCUMENTS

| 5,091,851 | A | 2/1992 | Shelton et al. |
|---|---|---|---|
| 5,109,520 | A | 4/1992 | Knierim |
| 5,325,511 | A | 6/1994 | Collins et al. |
| 5,452,426 | A | 9/1995 | Papworth et al. |
| 5,493,523 | A | 2/1996 | Huffman |
| 5,493,667 | A | 2/1996 | Huck et al. |
| 5,510,934 | A | 4/1996 | Brennen et al. |

(Continued)

FOREIGN PATENT DOCUMENTS

| GB | 2322718 A | 9/1998 |
|---|---|---|
| WO | WO 02/082278 A1 | 10/2002 |

OTHER PUBLICATIONS

ADSP-21535 Blackfin™ DSP Brochure, Analog Devices, Inc., 4 pages, 2001.

(Continued)

*Primary Examiner* — George Giroux
(74) *Attorney, Agent, or Firm* — Patterson Thuente Pedersen, P.A.

(57) ABSTRACT

A processor and system for latest producer tracking In one embodiment, the processor includes an operand renamer circuit that includes a register rename map, a producer tracking circuit that includes a producer tracking map, and a results buffer allocater circuit that includes a results buffer free list. Control logic modifies in-register status values stored in the register rename map based on producer tracking status values stored in the producer tracking map. The producer tracking status values stored in the producer tracking map are modified based on buffer identification values output by the results buffer allocater circuit.

17 Claims, 8 Drawing Sheets

(56) References Cited

U.S. PATENT DOCUMENTS

| | | |
|---|---|---|
| 5,526,504 A | 6/1996 | Hsu et al. |
| 5,537,538 A | 7/1996 | Bratt et al. |
| 5,546,545 A | 8/1996 | Rich |
| 5,568,630 A | 10/1996 | Killian et al. |
| 5,572,704 A | 11/1996 | Bratt et al. |
| 5,586,278 A | 12/1996 | Papworth et al. |
| 5,604,909 A | 2/1997 | Joshi et al. |
| 5,606,683 A | 2/1997 | Riordan |
| 5,632,025 A | 5/1997 | Bratt et al |
| 5,670,898 A | 9/1997 | Fang |
| 5,675,759 A | 10/1997 | Shebanow et al. |
| 5,734,881 A | 3/1998 | White et al. |
| 5,740,402 A | 4/1998 | Bratt et al. |
| 5,758,112 A | 5/1998 | Yeager et al. |
| 5,764,999 A | 6/1998 | Wilcox et al. |
| 5,765,037 A | 6/1998 | Morrison et al. |
| 5,781,753 A | 7/1998 | McFarland et al. |
| 5,784,584 A | 7/1998 | Moore et al. |
| 5,799,165 A | 8/1998 | Favor et al. |
| 5,802,339 A | 9/1998 | Sowadsky et al. |
| 5,802,386 A | 9/1998 | Kahle et al. |
| 5,809,326 A | 9/1998 | Nogami |
| 5,809,336 A | 9/1998 | Moore et al. |
| 5,881,257 A | 3/1999 | Glass et al. |
| 5,884,061 A | 3/1999 | Henson et al. |
| 5,954,815 A | 9/1999 | Joshi et al. |
| 5,961,629 A | 10/1999 | Nguyen et al. |
| 5,966,734 A | 10/1999 | Mohamed et al. |
| 5,974,535 A | 10/1999 | Peng et al. |
| 6,044,478 A | 3/2000 | Green |
| 6,076,159 A | 6/2000 | Fleck et al. |
| 6,079,014 A | 6/2000 | Papworth et al. |
| 6,085,315 A | 7/2000 | Fleck et al. |
| 6,216,200 B1 | 4/2001 | Yeager |
| 6,223,278 B1 | 4/2001 | Morrison |
| 6,247,114 B1 * | 6/2001 | Trull .................. G06F 9/3802 712/202 |
| 6,247,124 B1 | 6/2001 | Joshi et al. |
| 6,249,862 B1 | 6/2001 | Chinnakonda et al. |
| 6,266,755 B1 | 7/2001 | Yeager |
| 6,298,438 B1 | 10/2001 | Thayer et al. |
| 6,308,252 B1 | 10/2001 | Agarwal et al. |
| 6,393,550 B1 | 5/2002 | Fetterman |
| 6,430,655 B1 | 8/2002 | Courtright et al. |
| 6,473,837 B1 | 10/2002 | Hughes et al. |
| 6,477,639 B1 | 11/2002 | Krishman et al. |
| 6,505,285 B1 | 1/2003 | Rabinovici et al. |
| 6,546,477 B1 | 4/2003 | Russo et al. |
| 6,557,127 B1 | 4/2003 | Adams et al. |
| 6,594,728 B1 | 7/2003 | Yeager |
| 6,598,148 B1 | 7/2003 | Moore et al. |
| 6,691,221 B2 | 2/2004 | Joshi et al. |
| 6,757,817 B1 | 6/2004 | Booth |
| 6,760,835 B1 | 7/2004 | Yu |
| 6,836,833 B1 | 12/2004 | Kinter et al. |
| 6,915,495 B2 | 7/2005 | Singh |
| 7,032,226 B1 | 4/2006 | Nemirovsky et al. |
| 7,370,178 B1 | 5/2008 | Svendsen et al. |
| 7,401,205 B1 | 7/2008 | Dally et al. |
| 7,502,876 B1 | 3/2009 | Nemirovsky et al. |
| 7,747,830 B2 | 6/2010 | Svendsen et al. |
| 9,851,975 B2 | 12/2017 | Svendsen |
| 2003/0149862 A1 | 8/2003 | Kadambi |
| 2004/0128483 A1 | 7/2004 | Grochowski et al. |
| 2004/0193858 A1 | 9/2004 | Ahmad et al. |
| 2005/0102483 A1 | 5/2005 | Kinter et al. |
| 2006/0095732 A1 | 5/2006 | Tran et al. |
| 2006/0149904 A1 | 7/2006 | Mowry |
| 2006/0259747 A1 | 11/2006 | Gonzalez et al. |
| 2007/0204139 A1 | 8/2007 | Svendsen |
| 2008/0016326 A1 | 1/2008 | Svendsen et al. |
| 2008/0215857 A1 | 9/2008 | Svendsen et al. |
| 2015/0277925 A1 * | 10/2015 | Sleiman .............. G06F 9/3851 712/215 |
| 2018/0107486 A1 | 4/2018 | Svendsen |

OTHER PUBLICATIONS

Andes R10000 User's Manual, Revision 2.0, MIPS Technologies, Inc., Entire Text, Sep. 19, 1996.

Arvind, A. and Maessen, J. W., "Memory Model = Instruction Reordering + Store Atomicity," ACM SIGARCH Computer Architecture News, vol. 34, Issue 2, pp. 29-40, 2006.

Banakar, R. et al., "Scratchpad Memory: A Design Alternative for Cache On-chip memory in Embedded Systems," Proceedings of CODES '02, ACM, Estes Park, Colorado, pp. 73-78, May 2002.

Bellas, N. et al., "Architectural and Compiler Techniques for Energy Reduction in High-Performance Microprocesssors," IEEE Trans. on Very Large Scale Integration (VLSI) Systems, vol. 8, No. 3, pp. 317-326, Jun. 2000.

Bird, P.L., et al., "The Effectiveness of Decoupling," Proceedings of the $7^{th}$ Int'l Conference on Supercomputing, pp. 47-56, ACM Press, New York, NY 1993.

Bratt, J.P. et al., U.S. Appl. No. 08/168,094, filed Dec. 15, 1993, entitled "Superscalar Microprocessor Instruction Pipeline Including Instruction Dispatching and Kill Control".

Buti, T.N. et al., "Organization and implementation of the register-renaming mapper for out-of-order IBM POWER4 processors," IBM J. Res. & Dev. 49(1):167-188, International Business Machines Corporation, Jan. 2005.

Cotterell, S. and Vahid, F., "Tuning of Loop Cache Architecture to Programs in Embedded System Design," ISSS'02, 6 pages, Oct. 2002.

Courtright, D., "Introducing: The MIPS32™ 4Kc™ and MIPS32™ 4Kp™ Processor Cores 'Jade'," paper copy of slide presentation distributed at the Embedded Microprocessor Forum, pp. 1-25, May 1999.

De Vries, H., Understanding the detailed Architecture of AMD's 64 bit Core, 95 pages, printed Oct. 16, 2007 from http://chip-architect.com/news/2003_09_21_Detailed_Architecture_of_AMDs_64bit_Core.html, Sep. 21, 2003.

Dally, W.J. et al., U.S. Appl. No. 09/637,500, filed Aug. 11, 2000, entitled "High Performance RISC Instruction Set Digital Signal Processor Having Circular Buffer and Looping Controls."

Flynn et al., "Using Simple Tools to Evaluate Complex Architectural Trade-Offs," IEEE Micro, pp. 67-75, Jul.-Aug. 2000.

Fukuoka, K. et al., "Leakage Power Reduction for Clock Gating Scheme on PD-SOI," IEEE Computer Society Int'l Symp. on Circuits and Systems, pp. 613-616, 2004.

Goodman, J.R.et al., "PIPE: A VLSI Decoupled Architecture," ACM SIGARCH Computer Architecture News, pp. 20-27—, ACM Press, New York, NY, Jun. 1985.

Gwennap, L., "MIPS R10000 Uses Decoupled Architecture," Microprocessor Report, vol. 8, No. 14, pp. 1-5, Oct. 24, 1994.

Gwennap, L., "MIPS R12000 to Hit 300 MHz," Microprocessor Report, vol. 11, No. 13, pp. 1-4, Oct. 6, 1997.

Gwennap, L., "MIPS Roadmap Focuses on Bandwidth," Microprocessor Report, pp. 1-3, May 12, 1997.

Gwennap, L., "SGI Provides Overview of TFP CPU," Microprocessor Report, vol. 7, No. 2, pp. 1-2, Feb. 5, 1993.

Gwennap, L., "TFP Designed for Tremendous Floating Point," Microprocessor Report, vol. 7, No. 11, pp. 1-5, Aug. 23, 1993.

Intel Architecture Software Developer's Manual—Volume 2: Instruction Set Reference, Intel. Corporation pp. 3-278 and 3-279, 1997.

Intel Architecture Software Developer's Manual, vol. 1-3, pp. 2-7, 2-10, 2-11, 2-12, 3-329, 9-16, A-10, and A-20, 1999.

Intel® StrongARM® SA-1100 Microprocessor Developer's Manual, Intel. Corporation, pp. i-xix, 1-1 through 1-7, 2-1 through 2-8, and 6-1 through 6-7, Aug. 1999.

Kandemir, M. et al., "Dynamic Management of Scratch-Pad Memory Space," Proceedings of the $38^{th}$ Design Automation Conference, ACM, Las Vegas, Nevada, pp. 690-695, Jun. 2001.

Kandemir, M. et al., "Exploiting Scratch Pad Memory Using Presburger Formulas," Proceedings of ISSS '01 ACM, Montreal, Quebec, Canada, pp. 7-12, Oct. 2001.

Kandemir, M. et al., Exploiting Shared Scratch Pad Memory Space in Embedded Multiprocessor Systems, Proceedings of the $39^{th}$ Design Automation Conference, ACM, New Orleans, Louisiana, pp. 219-224, Jun. 2002.

(56) References Cited

OTHER PUBLICATIONS

Kiyohara, T. et al., "Register Connection: A New Approach to Adding Registers into Instruction Set Architectures," Int'l Conf. on Computer Architectures—Proc. of the 20$^{th}$ Annual Int'l Symp. on Computer Architecture, San Diego, CA, pp. 247-256, 1993.
Krewell, K., "Intel Looks to Core for Success," Microprocessor Report, vol. 20, pp. 1, 4, 5 and 6, Mar. 2006.
Lee, L.H. et al., "Instruction Fetch Energy Reduction Using Loop Caches for Embedded Applications with Small Tight Loops," ISLPED'99, pp. 267-269, 1999.
Lipasti, M. et al., "Physical Register Inlining," at <http://www.ece.wisc.edu/pharm/papers/isca2004_egundai.pdf>, 11 pages, retrieved Jun. 12, 2006.
Merten, M.C. et al., Modulo Schedule Buffers, IEEE, pp. 138-149, Dec. 2001.
MIPS R10000 Microprocessor User's Manual, Version 2.0, MIPS Technologies, Inc., 424 pages, Jan. 29, 1997.
Nass, R., "Latest DSP's Poised to Drive 3G Revolution," Portable Design 8(9):26, 27, 28, 32, and 34, PennWell Corporation, Fair Lawn, New Jersey, Sep. 2001.
Nemirovsky, M. et al., U.S. Appl. No. 09/602,279, filed Jun. 23, 2000, entitled "Methods and Apparatus for Background Memory Management."
Osborne, M. et al., "Superscalar Pipeline Architectures," Slide Presentation, 36 pages, downloaded Jun. 19, 2007 from http://www.academic.marist.edu/jzbv/architecture/projects2004/SuperscalarArchitectures.ppt, Apr. 19, 2004.
Panda, P. et al., "Data Memory Organization and Optimizations in Application-Specific Systems," IEEE Design & Test of Computers, IEEE, pp. 56-68, May 2001.
Panda, P. et al., "Efficient Utilization of Scratch-Pad Memory in Embedded Processor Applications," Proceedings of the European Design & Test Conference ED&TC 97, IEEE, Paris, France, pp. 7-11, Mar. 1997.
Peng, M. and Azgomi, S., "Content-Addressable memory (CAM) and its network applications," at http://www.eetasia.com/ARTICLES/2000MAY/2000MAY03_MEM_NTEK_TAC.PDF, 3 pages, retrieved Jun. 12, 2006.
Pierce, J. and Mudge, T., "Wrong-Path Instruction Prefetching," IEEE Computer Society 29$^{th}$ Int'l. Symp. on Microarchitecture, pp. 165-175, 1996.
Price, C., MIPS R10000 MIPS IV ISA Manual: Andes, Revision 3.2, MIPS Technologies, Inc., 323 pages, Sep. 1995.
Rhodes, S., MIPS R8000 Microprocessor Chip Set User's Manual, Revision 3.0, Silicon Graphics, Inc., 352 pages, Jul. 1994.
Schmidt, D.C., "Transparently Parameterizing Synchronization into a Concurrent Distributed Application: A Case Study of C++ Design Evolution," C++ Report, SIGS Publications, vol. 6, No. 3, 10 pages, Jul.-Aug. 1994.
Shen et al., "Modern Processor Design," McGraw-Hill, published Jul. 7, 2009, pp. 239-242 and 254-259.
Smith, J.E. et al., "The ZS-1 Central Processor," Proceedings of the Second Int'l Conference on Architectural Support for Programming Languages and Operating Systems, pp. 199-204, IEEE Computer Society Press, Los Alamitos, CA, 1987.
Smith, J.E, "Retrospective: Decoupled Access/Execute Computer Architectures," 25 Years of the International Symposia on Computer Architecture (Selected Papers), pp. 27-28, ACM Press, New York, NY, Jun. 1998.
Solomon, B. et al., "Micro-Operation Cache: A Power Aware Frontend for Variable Instruction Length ISA," Symp. on Low Power Electronics and Design, pp. 4-9, Aug. 2001.
SPARC64 V Processor for UNIX Server, Revision 1.0, Fujitsu Limited, 24 pages, Aug. 2004.
Sung, M. et al., "Multithreading Decoupled Architectures for Complexity-Effective General Purpose Computing," ACM SIGARCH Computer Architecture News, vol. 29, Issue 5, pp. 56-61, ACM Press, New York, NY, Dec. 2001.
Taylor, M., The Raw Prototype Design Document, Dept. of Electrical Engineering and Computer Science—Massachusetts Institute of Technology, pp. 1, 5, 6, 10 and 53, Nov. 1999.
VRSeries™ User's Manual: VR10000™ Microprocessor, Version 1.0 NEC, Entire Text, Nov. 1995.
Watts, C. et al., "ARM Intelligent Energy Manager Future Evolution," paper copy of slide presentation distributed at the ARM Developers' Conference '04, 34 sheets, Oct. 2004.
Yeager, K.C., "The MIPS R10000 Superscalar Microprocessor," IEEE Micro, pp. 28-40, 1996.
File history for U.S. Appl. No. 12/104,308, filed Apr. 16, 2008. Inventors: Kjeld Svendsen et al.
File history for U.S. Appl. No. 11/485,959, filed Jul. 14, 2006. Inventors: Kjeld Svendsen et al.
File history for U.S. Appl. No. 11/485,960, filed Jan. 17, 2008. Inventors: Kjeld Svendsen et al.

\* cited by examiner

| | Instruction Fetch | Instruction Decode | Instruction Execute | Instruction Graduate |
|---|---|---|---|---|
| $T_0$ | ADD-1 (R3, R1, R2) | — | — | — |
| $T_1$ | — | ADD-1 (B1, R1, R2) | — | — |
| $T_2$ | ADD-2 (R3, R1, R4) | — | ADD-1 (B1, R1, R2) | — |
| $T_3$ | — | ADD-2 (B4, R1, R4) | — | ADD-1 (B1, R1, R2) |
| $T_4$ | — | — | ADD-2 (B4, R1, R4) | — |
| $T_5$ | — | — | — | ADD-2 (B4, R1, R4) |

Register Rename Map

| RID | BID | INR |
|---|---|---|
| R1 | B3 | 1 |
| R2 | B8 | 1 |
| R3 | B12 | 1 |
| R4 | B15 | 1 |

| RID | BID | INR |
|---|---|---|
| R1 | B3 | 1 |
| R2 | B8 | 1 |
| R3 | B1 | 0 |
| R4 | B15 | 1 |

| RID | BID | INR |
|---|---|---|
| R1 | B3 | 1 |
| R2 | B8 | 1 |
| R3 | B1 | 0 |
| R4 | B15 | 1 |

| RID | BID | INR |
|---|---|---|
| R1 | B3 | 1 |
| R2 | B8 | 1 |
| R3 | B4 | 0 |
| R4 | B15 | 1 |

| RID | BID | INR |
|---|---|---|
| R1 | B3 | 1 |
| R2 | B8 | 1 |
| R3 | B4 | 0 |
| R4 | B15 | 1 |

| RID | BID | INR |
|---|---|---|
| R1 | B3 | 1 |
| R2 | B8 | 1 |
| R3 | B4 | 1 |
| R4 | B15 | 1 |

Producer Tracking Map

| B0 | 0 |
|---|---|
| B1 | 0 |
| B2 | 0 |
| B3 | 0 |
| B4 | 0 |

| B0 | 0 |
|---|---|
| B1 | 1 |
| B2 | 0 |
| B3 | 0 |
| B4 | 0 |

| B0 | 0 |
|---|---|
| B1 | 1 |
| B2 | 0 |
| B3 | 0 |
| B4 | 0 |

| B0 | 0 |
|---|---|
| B1 | 1 |
| B2 | 0 |
| B3 | 0 |
| B4 | 1 |

| B0 | 0 |
|---|---|
| B1 | 0 |
| B2 | 0 |
| B3 | 0 |
| B4 | 1 |

| B0 | 0 |
|---|---|
| B1 | 0 |
| B2 | 0 |
| B3 | 0 |
| B4 | 0 |

FIG. 7

LATEST PRODUCER TRACKING IN AN OUT-OF-ORDER PROCESSOR, AND APPLICATIONS THEREOF

RELATED APPLICATIONS

This application is a continuation of U.S. patent application Ser. No. 11/485,960 filed Jul. 14, 2006, which is related to commonly owned U.S. patent application Ser. No. 11/485,959 filed Jul. 14, 2006, now U.S. Pat. No. 7,370,178 issued May 6, 2008, titled "Method For Latest Producer Tracking In An Out-Of-Order Processor And Applications Thereof," each of which is incorporated herein by reference in its entirety.

FIELD OF THE INVENTION

The present invention relates generally to processors and more particularly to processors having an out-of-order execution pipeline.

BACKGROUND OF THE INVENTION

Reduced Instruction Set Computer (RISC) processors are well known. RISC processors have instructions that facilitate the use of a technique known as pipelining. Pipelining enables a processor to work on different steps of an instruction at the same time and thereby take advantage of parallelism that exists among the steps needed to execute an instruction. As a result, a processor can execute more instructions in a shorter period of time. Additionally, modern Complex Instruction Set Computer (CISC) processors often translate their instructions into micro-operations (i.e., instructions similar to those of a RISC processor) prior to execution to facilitate pipelining.

Many pipelined processors, especially those used in the embedded market, are relatively simple in-order machines. As a result, they are subject to control, structural, and data hazard stalls. More complex processors have out-of-order execution pipelines. These more complex processors, often referred to as out-of-order processors, schedule execution of instructions around hazards that would stall an in-order machine.

Register renaming is a technique used by out-of-order processors to avoid unnecessary serialization of program operations imposed by the reuse of logical registers. In a conventional out-of-order processor, register renaming is implemented using a custom content-addressable memory (CAM) that holds a register map. The register map identifies associations formed between physical registers and logical registers. The CAM register map is searched, for example, during instruction decode and dispatch operations to identify physical registers that hold the latest results for source logical registers specified by an instruction.

In a conventional out-of-order processor, other register status information such as, for example, information that indicates whether register data is available in a register file or off a bypass is also maintained in a custom CAM. While custom CAMs and conventional out-of-order processing techniques work for their intended purposes, they are costly to implement in terms of chip area, power consumption, and processing speed. As a result, especially in the embedded market, the number of applications in which a conventional out-of-order processor may be used is restricted.

What are needed are new techniques for implementing out-of-order processing that overcome the limitations associated with conventional techniques.

BRIEF SUMMARY OF THE INVENTION

The present invention provides a processor and system for latest producer tracking, and applications thereof. In one embodiment, the processor includes an operand renamer circuit that includes a register rename map, a producer tracking circuit that includes a producer tracking map, and a results buffer allocater circuit that includes a results buffer free list.

The register rename map associates particular physical registers of a results buffer with particular logical/architectural state registers of a register file. The register rename map is indexed using register identification (RID) values. Each RID value represents a logical/architectural state register of the register file. The register rename map stores buffer identification (BID) values and in-register (INR) status values. Each BID value represents a physical register of a results buffer. The INR values are used to determine whether particular data values are available in a logical/architectural state register of the register file or in a physical register of the results buffer.

The producer tracking map stores producer tracking status values. These status values are used to identify which physical registers of the results buffer are being used by instructions to store the latest data prior to the data being transferred to logical/architectural state registers of the register file. The producer tracking status values stored in the producer tracking map are modified in one embodiment by placing BID values produced by the results buffer allocater circuit on a BID set bus or a BID clear bus of the producer tracking circuit.

The results buffer free list stores status values that identify which physical registers of the results buffer are available to store a value produced by an instruction. Instructions that produce values are assigned physical registers in which their results can be stored until instruction graduation. The function of the results buffer allocater circuit is to keep track of physical register availability and to output a BID value representing a physical register, which can be assigned to an instruction and used to store the value produced by the instruction.

Control logic modifies the INR status values stored in the register rename map based on the producer tracking status values stored in the producer tracking map.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 7 is a diagram that illustrates operation of a processor according to an embodiment of the present invention.

The present invention is described with reference to the accompanying drawings. The drawing in which an element first appears is typically indicated by the leftmost digit or digits in the corresponding reference number.

DETAILED DESCRIPTION OF THE INVENTION

The present invention provides a processor, system, and method for latest producer tracking in a processor, and applications thereof. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
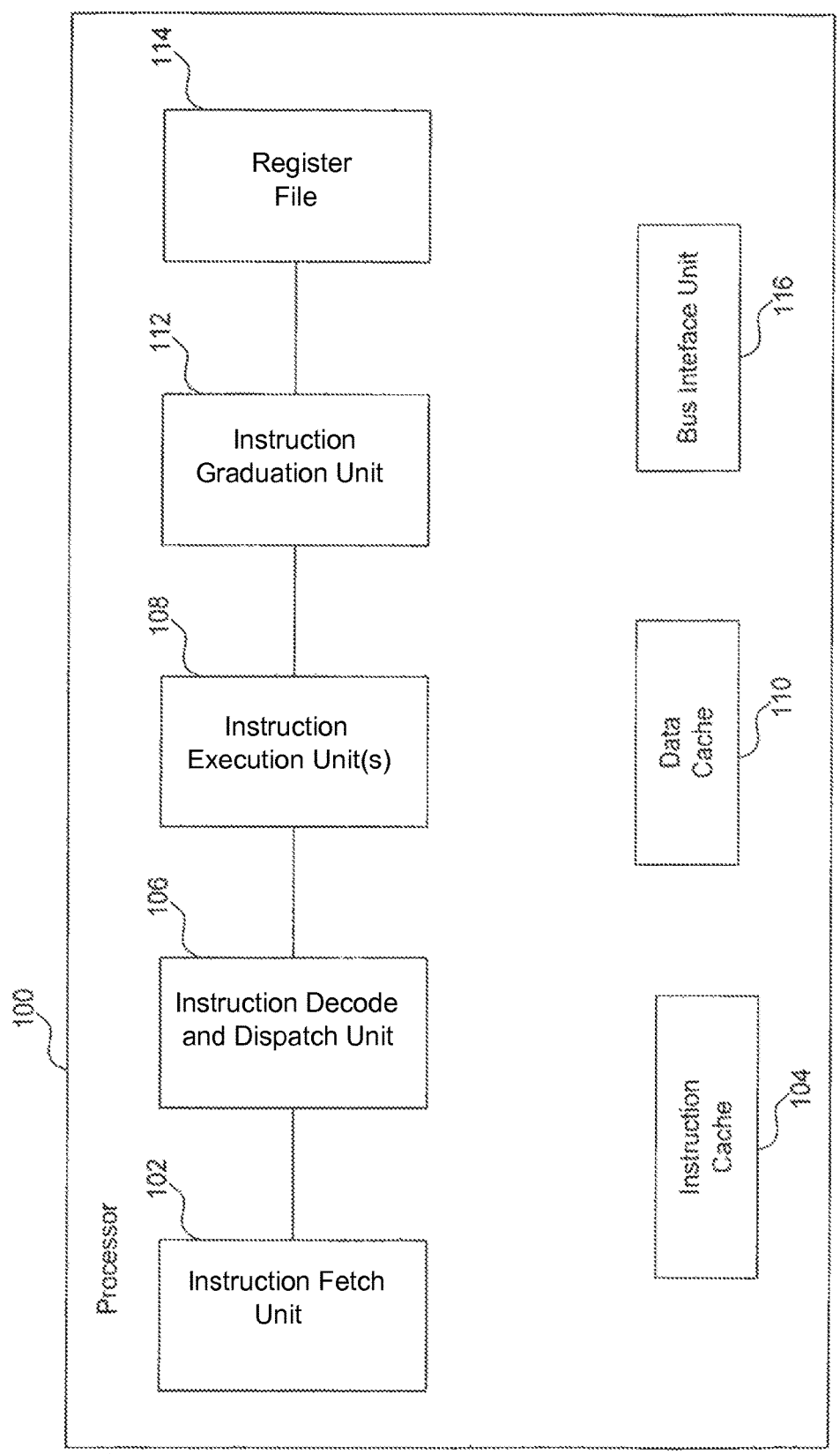
FIG. 1 is a diagram of a processor according to an embodiment of the present invention.

FIG. 1 illustrates an example processor 100 according to an embodiment of the present invention. As shown in FIG. 1, processor 100 includes an instruction fetch unit 102, an instruction cache 104, an instruction decode and dispatch unit 106, one or more instruction execution unit(s) 108, a data cache 110, an instruction graduation unit 112, a register file 114, and a bus interface unit 116. Processor 100 is preferably capable of implementing multi-threading, but need not implement multi-threading. As used herein, multi-threading refers to an ability of an operating system and a processor to execute different parts of a program, called threads, simultaneously.

Instruction fetch unit 102 retrieves instructions from instruction cache 104 and provides instructions to instruction decode and dispatch unit 106. Instructions are retrieved in program order, for example, for one or more program threads. In one embodiment, instruction fetch unit 102 includes logic for recoding compressed format instructions to a format that can be decoded and executed by processor 100. In one embodiment, instruction fetch unit 102 includes an instruction buffer that enables instruction fetch unit 102 to hold multiple instructions for multiple program threads, which are ready for decoding, and to issue more than one instruction at a time to instruction decode and dispatch unit 106.

Instruction cache 104 is an on-chip memory array organized as a direct associative or multi-way set associative cache such as, for example, a 2-way set associative cache or a 4-way set associative cache. In one embodiment, instruction cache 104 is virtually indexed and physically tagged, thereby allowing virtual-to-physical address translations to occur in parallel with cache accesses. Instruction cache 104 interfaces with instruction fetch unit 102.

Instruction decode and dispatch unit 106 receives one or more instructions at a time from instruction fetch unit 102 and decodes them prior to execution. In one embodiment, instruction decode and dispatch unit 106 receives at least one instruction for each program thread being implemented during a particular clock cycle. As described herein, the number of program threads being implemented at any given point in time is variable. Decoded instructions are stored in a decoded instruction buffer and issued to instruction execution unit(s) 108, for example, after it is determined that selected operands are available. Instructions can be dispatched from instruction decode and dispatch unit 106 to instruction execution unit(s) 108 out-of-program-order.

Instruction execution unit(s) 108 execute instructions dispatched by instruction decode and dispatch unit 106. In one embodiment, at least one instruction execution unit 108 implements a load-store (RISC) architecture with single-cycle arithmetic logic unit operations (e.g., logical, shift, add, subtract, etc.). Other instruction execution unit(s) 108 can include, for example, a floating point unit, a multiple-divide unit and/or other special purpose co-processing units. In embodiments having multiple instruction execution units 108, one or more of the units can be implemented, for example, to operate in parallel. Instruction execution unit(s) 108 interface with data cache 110, register file 114, and a results buffer (not shown).

Data cache 110 is an on-chip memory array. Data cache 110 is preferably virtually indexed and physically tagged. Data cache 110 interfaces with instruction execution unit(s) 108.

Register file 114 represents a plurality of general purpose registers (e.g., logical/architectural state register), which are visible to a programmer. Each general purpose register is a 32-bit or a 64-bit register, for example, used for logical and/or mathematical operations and address calculations. In one embodiment, register file 114 is part of instruction execution unit(s) 108. Optionally, one or more additional register file sets (not shown), such as shadow register file sets, can be included to minimize content switching overhead, for example, during interrupt and/or exception processing.

Bus interface unit 116 controls external interface signals for processor 100. In one embodiment, bus interface unit 116 includes a collapsing write buffer used to merge write-through transactions and gather writes from uncached stores. Processor 100 can include other features, and thus it is not limited to having just the specific features described herein.

Figure 2:
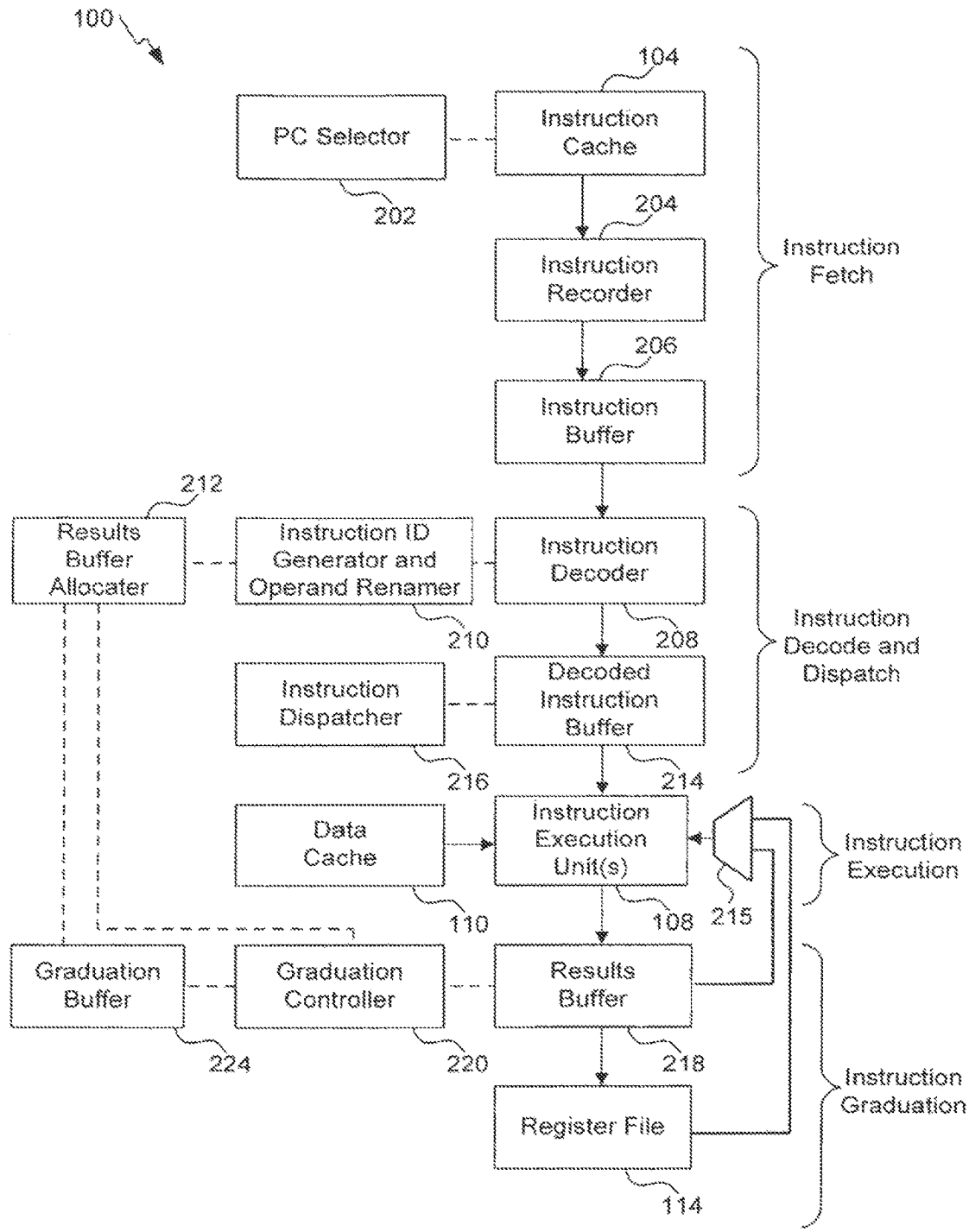
FIG. 2 is a more detailed diagram of the processor of FIG. 1.

FIG. 2 is a more detailed diagram of processor 100. As illustrated in FIG. 2, processor 100 performs four basic functions: instruction fetch; instruction decode and dispatch; instruction execution; and instruction graduation. These four basic functions are illustrative and not intended to limit the present invention.

Instruction fetch (represented in FIG. 1 by instruction fetch unit 102) begins when a PC selector 202 selects amongst a variety of program counter values and determines a value that is used to fetch an instruction from instruction cache 104. In one embodiment, the program counter value selected is the program counter value of a new program thread, the next sequential program counter value for an existing program thread, or a redirect program counter value associated with a branch instruction or a jump instruction. After each instruction is fetched, PC selector 202 selects a new value for the next instruction to be fetched.

During instruction fetch, tags associated with an instruction to be fetched from instruction cache 104 are checked. In one embodiment, the tags contain precode bits for each instruction indicating instruction type. If these precode bits indicate that an instruction is a control transfer instruction, a branch history table is accessed and used to determine whether the control transfer instruction is likely to branch or likely not to branch.

In one embodiment, any compressed-format instructions that are fetched are recoded by an optional instruction recoder 204 into a format that can be decoded and executed by processor 100. For example, in one embodiment in which processor 100 implements both 16-bit instructions and 32-bit instructions, any 16-bit compressed-format instructions are recoded by instruction recoder 204 to form instructions having 32 bits. In another embodiment, instruction recoder 204 recodes both 16-bit instructions and 32-bit instructions to a format having more than 32 bits.

After optional recoding, instructions are written to an instruction buffer 206. In one embodiment, this stage can be bypassed and instructions can be dispatched directly to instruction decoder 208.

Instruction decode and dispatch (represented in FIG. 1 by instruction decode and dispatch unit 106) begins, for example, when one or more instructions are received from instruction buffer 206 and decoded by an instruction decoder 208. In one embodiment, following resolution of a branch misprediction, the ability to receive instructions from instruction buffer 206 may be temporarily halted until selected instructions residing within the instruction execution portion and/or instruction graduation portion of processor 100 are purged.

In parallel with instruction decoding, operands are renamed. Register rename map(s) located within instruction identification (ID) generator and operand renamer 210 are updated and used to determine whether required source operands are available, for example, in register file 114 and/or a results buffer 218. A register rename map is a structure that holds the mapping information between programmer visible architectural state registers and internal physical registers of processor 100. Register rename map(s) indicate whether data is available and where data is available. As will be understood by persons skilled in the relevant arts given the description herein, register renaming is used to remove instruction output dependencies and to ensure that there is a single producer of a given register in processor 100 at any given time. Source registers are renamed so that data is obtained from a producer at the earliest opportunity instead of waiting for the processor's architectural state to be updated. In parallel with instruction decoding, instruction ID generator and operand renamer 210 generates and assigns an instruction ID tag to each instruction. An instruction ID tag assigned to an instruction is used, for example, to determine the program order of the instruction relative to other instructions. In one embodiment, each instruction ID tag is a thread-specific sequentially generated value that uniquely determines the program order of instructions. The instruction ID tags can be used to facilitate graduating instructions in-program-order, which were executed out-of-program-order.

Each decoded instruction is assigned a results buffer identification value or tag by a results buffer allocater 212. The results buffer identification value determines the location in results buffer 218 (e.g., a physical register) where instruction execution unit(s) 108 can write calculated results for an instruction. In one embodiment, the assignment of results buffer identification values are accomplished using a free list. The free list contains as many entries as the number of entries (e.g., physical registers) that make up results buffer 218. The free list can be implemented, for example, using a bitmap. A first bit of the bitmap can be used to indicate whether the results buffer entry is either available (e.g., if the bit has a value of one) or unavailable (e.g., if the bit has a value of zero).

Assigned results buffer identification values are written into a graduation buffer 224. In one embodiment, results buffer completion bits associated with newly renamed instructions are reset/cleared to indicate incomplete results. As instructions complete execution, their corresponding results buffer completion bits are set, thereby enabling the instructions to graduate and release their associated results buffer identification values. In one embodiment, control logic (not shown) ensures that one program thread does not consume more than its share of results buffer entries.

Decoded instructions are written to a decoded instruction buffer 214. An instruction dispatcher 216 selects instructions residing in decoded instruction buffer 214 for dispatch to execution unit(s) 108. In embodiments, instructions can be dispatched for execution out-of-program-order. In one embodiment, instructions are selected and dispatched, for example, based on their age (ID tags) assuming that their operands are determined to be ready.

Instruction execution unit(s) 108 execute instructions as they are dispatched. During execution, operand data is obtained as appropriate from data cache 110, register file 114, and/or results buffer 218. A multiplexer 215 and/or comparators (not shown) can be used to select data from results buffer 218 or register file 114. A result calculated by instruction execution unit(s) 108 for a particular instruction is written to a location/entry of results buffer 218 specified by the instruction's associated results buffer identification value.

Instruction graduation (represented in FIG. 1 by instruction graduation unit 112) is controlled by a graduation controller 220. Graduation controller 220 graduates instructions in accordance with the results buffer identification values stored in graduation buffer 224. When an instruction graduates, its associated result is transferred from results buffer 218 to register file 114. In conjunction with instruction graduation, graduation controller 220 updates, for example, the free list of results buffer allocater 212 to indicate a change in availability status of the graduating instruction's assigned results buffer identification value.

Figure 3:
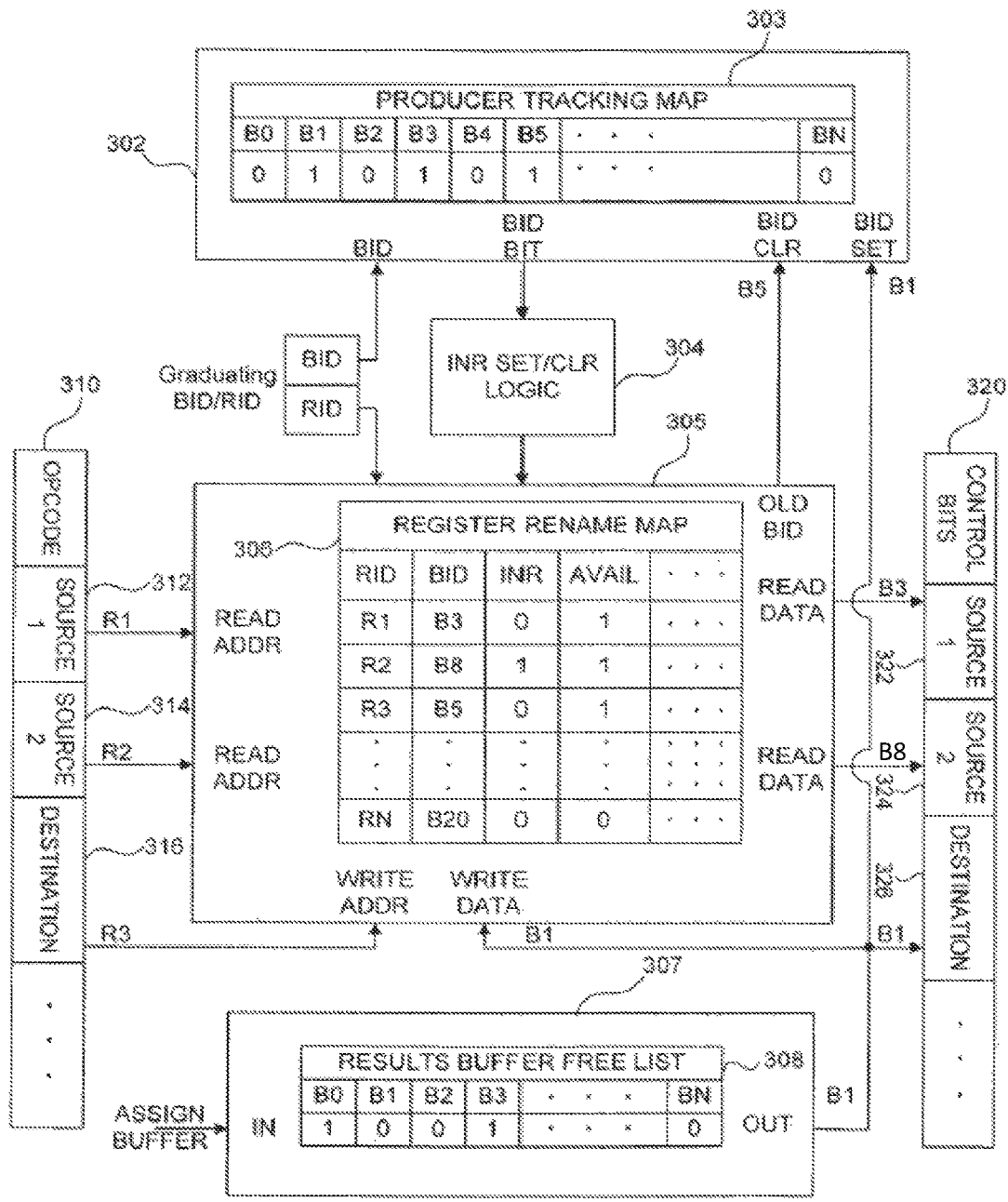
FIG. 3 is a diagram illustrating a relationship between a producer tracking map, a register rename map, and a results buffer free list of a processor according to an embodiment of the present invention.

As illustrated in FIG. 3, in embodiments of the present invention, processor 100 includes a producer tracking circuit 302, an operand renamer circuit 305, and a results buffer allocater circuit 307, which are interconnected and used to keep track of instructions that are the latest producers of values to be stored in particular registers of register file 114.

Producer tracking circuit 302 includes a producer tracking map 303. Producer tracking map 303 stores producer tracking status values that are used to identify which physical registers of results buffer 218 are being used by instructions to store the latest data for particular logical register. As shown in FIG. 3, the "1" bits stored in producer tracking map 303 for physical registers B1, B3, and B5 indicate that the instructions writing their data to physical registers B1, B3, and B5 are the latest producers of particular data values associated with particular logical registers.

In an embodiment, producer tracking map 303 stores "N" one-bit producer tracking status values, where "N" is the number of physical registers of results buffer 218. The "N" one-bit values are indexed using buffer identification (BID) values associated with the physical registers of results buffer 218. When a BID value is placed on an address bus of producer tracking circuit 302, a producer tracking status value corresponding to the BID value is output at a read data bus of producer tracking circuit 302. As shown in FIG. 3, this producer tracking status value is provided to in-register status value set/clear (INR SET/CLR) logic 304. Although INR SET/CLR logic 304 is illustrated as being separate from producer tracking circuit 302 and operand renamer circuit 305, it is to be understood that INR SET/CLR logic 304 can be implemented, for example, as a part of producer tracking circuit 302 and/or a part of operand renamer circuit 305. Particular producer tracking status values stored in producer tracking map 303 can be modified (e.g., set or cleared) by placing a BID value on a BID set bus or a BID clear bus.

Operand renamer circuit 305 includes a register rename map 306. Register rename map 306 associates particular physical registers of results buffer 218 with particular logical/architectural state registers of register file 114.

In an embodiment, register rename map 306 is indexed using register identification (RID) values. Each RID value represents one of the logical/architectural state registers of register file 114. As shown in FIG. 3, register rename map 306 stores, for example, for each RID index value, a buffer identification (BID) value and an in-register (INR) status value. Each BID value represents a physical register of results buffer 218. The INR values are used to determine whether particular data values are available in a logical/architectural state register of register file 114 or in a physical register of results buffer 218. Other values such as, for example, a data availability (AVAIL) status value can also be stored as part of register rename map 306 and indexed by RID values. An AVAIL status value can be used, for example, to identify whether an instruction can be dispatched.

In an embodiment, operand renamer circuit 305 preferably has two read address busses, two read data busses, a write address bus, and a write data bus, as illustrated in FIG. 3. Operand renamer circuit 305 also has an old BID value read bus that is coupled to the BID clear bus of producer tracking circuit 302.

Results buffer allocater circuit 307 includes a results buffer free list 308. Results buffer free list 308 stores status values that identify which physical registers of results buffer 218 are available to store a value produced by an instruction. In an embodiment, results buffer free list 308 stores "N" one-bit status values, where "N" is the number of physical registers of results buffer 218.

In the instruction decode and dispatch portion of the pipeline of processor 100, instructions that produce values are assigned physical registers in which their results can be stored until instruction graduation. The function of results buffer allocater circuit 307 is to output a BID value representing a physical register, which can be assigned to an instruction and used to store the value produced by the instruction. As shown in FIG. 3, the BID value output by results buffer allocater circuit 307 is provided to producer tracking circuit 302 and to operand renamer circuit 305.

The operations and interactions of producer tracking circuit 302, operand renamer circuit 305, and results buffer allocater circuit 307, as they relate to tracking an instruction (e.g., an ADD instruction) that is the latest producer of a data value associated with a particular logical register, will now be described in detail with references to FIGS. 3-6.

Referring to FIG. 3, in an embodiment of the present invention, an instruction to be decoded is stored in a processor pipeline register 310. This occurs in the instruction decode and dispatch portion of the pipeline of processor 100 (see FIGS. 1 and 2). Each instruction to be decoded may potentially include a first group of bits 312 that specify a first logical/architectural state register (Source 1), a second group of bits 314 that specify a second logical/architectural state register (Source 2), and/or a third group of bits 316 that specify a third logical/architectural state register (Destination). These groups of bits, if present, are provided to operand renamer circuit 305. As an example, consider an ADD instruction such as "ADD (R3, R1, R2)," which implements "R3=R1+R2." Such an instruction includes bits that identify the Source 1 register as register R1, the Source 2 register as register R2, and the Destination register as register R3.

Continuing further with the example ADD instruction noted above, as shown in FIG. 3, the bits 312 of the example ADD instruction, which represent register R1, are provided to a first read address bus of operand renamer circuit 305. Bits 312 are used as an index into register rename map 306. As shown in FIG. 3, the bits representing register R1 index BID bits stored in register rename map 306 that represent a physical register B3 of results buffer 218. As a result of the bits 312 being placed on the first read address bus, the bits representing physical register B3 are placed on a first read data bus of operand renamer circuit 305. The bits representing physical register B3 are then stored as bits 322 in a second processor pipeline register 320 in a subsequent clock cycle of processor 100.

The bits 314 of the example ADD instruction, which represent register R2, are provided to a second read address bus of operand renamer circuit 305. Bits 314 are also used as an index into register rename map 306. As shown in FIG. 3, the bits representing register R2 index BID bits stored in register rename map 306 that represent a physical register B8 of results buffer 218. As a result of the bits 314 being placed on the second read address bus, the bits representing physical register B8 are placed on a second read data bus of operand renamer circuit 305. The bits representing physical register B8 are then stored as bits 324 in the second pipeline register 320 in a subsequent clock cycle of processor 100.

The bits 316 of the example ADD instruction, which represent register R3, are provided to a write address bus of operand renamer circuit 305. Bits 316 are used as an index into register rename map 306. As shown in FIG. 3, the bits representing register R3 index BID bits stored in register rename map 306 that represent a physical register B5 of results buffer 218. As a result of the bits 316 being placed on the write address bus, the bits representing physical register B5 are placed on an old BID bus of operand renamer circuit 305. This feature of the present invention is illustrated in more detail in FIG. 4.

Figure 4:
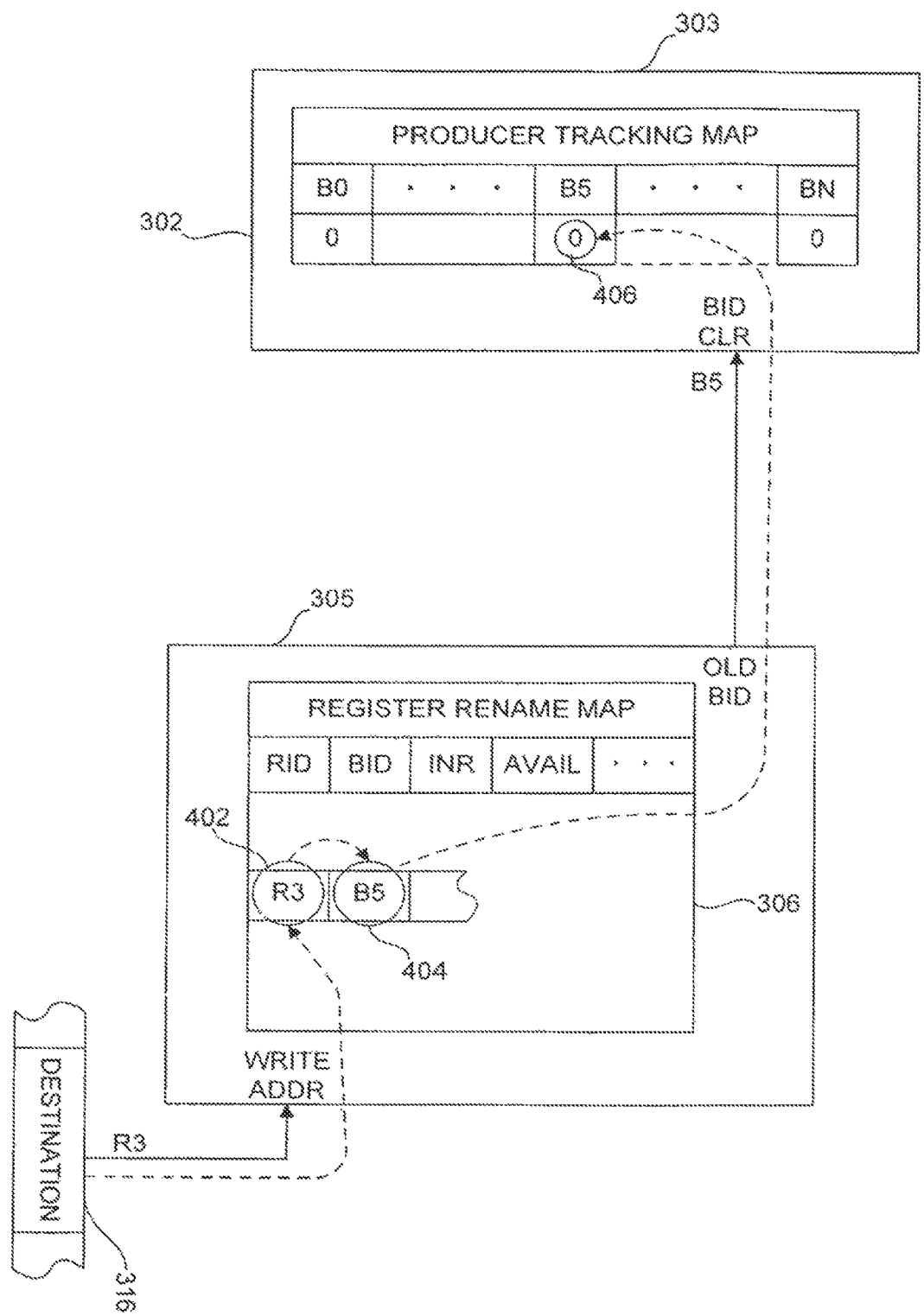
FIG. 4 is a diagram that illustrates clearing a status bit of a producer tracking map according to an embodiment of the present invention.

FIG. 4 is a diagram that illustrates the clearing of a producer tracking status bit of producer tracking map 303 according to an embodiment of the present invention. As shown in FIG. 4, bits 316 act as an index 402 into register rename map 306 of operand renamer circuit 305. Index 402 points to a location 404 of register rename map 306.

As shown in FIG. 4, location 404 stores bits that represent physical register B5 of results buffer 218. The association of physical register B5 with logical register R3, together with the producer tracking status value stored at location 406 of producer tracking map 303, indicates that prior to the example ADD instruction noted above, physical register B5 was the physical register used by an instruction that was the latest producer of a particular data value associated with logical register R3. Because this will no longer be the case (i.e., the example ADD instruction will be the latest producer), the producer tracking status value (i.e., the "1" bit stored at location 406 of producer tracking map 303) must be cleared. In an embodiment, clearing the "1" bit in location 406 is accomplished by placing the bits representing physical register B5 on the BID clear bus of producer tracking circuit 302.

In parallel with clearing the bit at location 406 of producer tracking map 303, a physical register "B1" is allocated by results buffer allocater circuit 307 to hold the result of the example ADD instruction until the example ADD instruction graduates. As shown in FIG. 3, bits representing physical register B1 are provided by results buffer allocater circuit 307 to pipeline buffer 320, operand renamer circuit 305, and producer tracking circuit 302. As shown in FIG. 3, these bits are stored in pipeline register 320 as bits 326.

Figure 5:
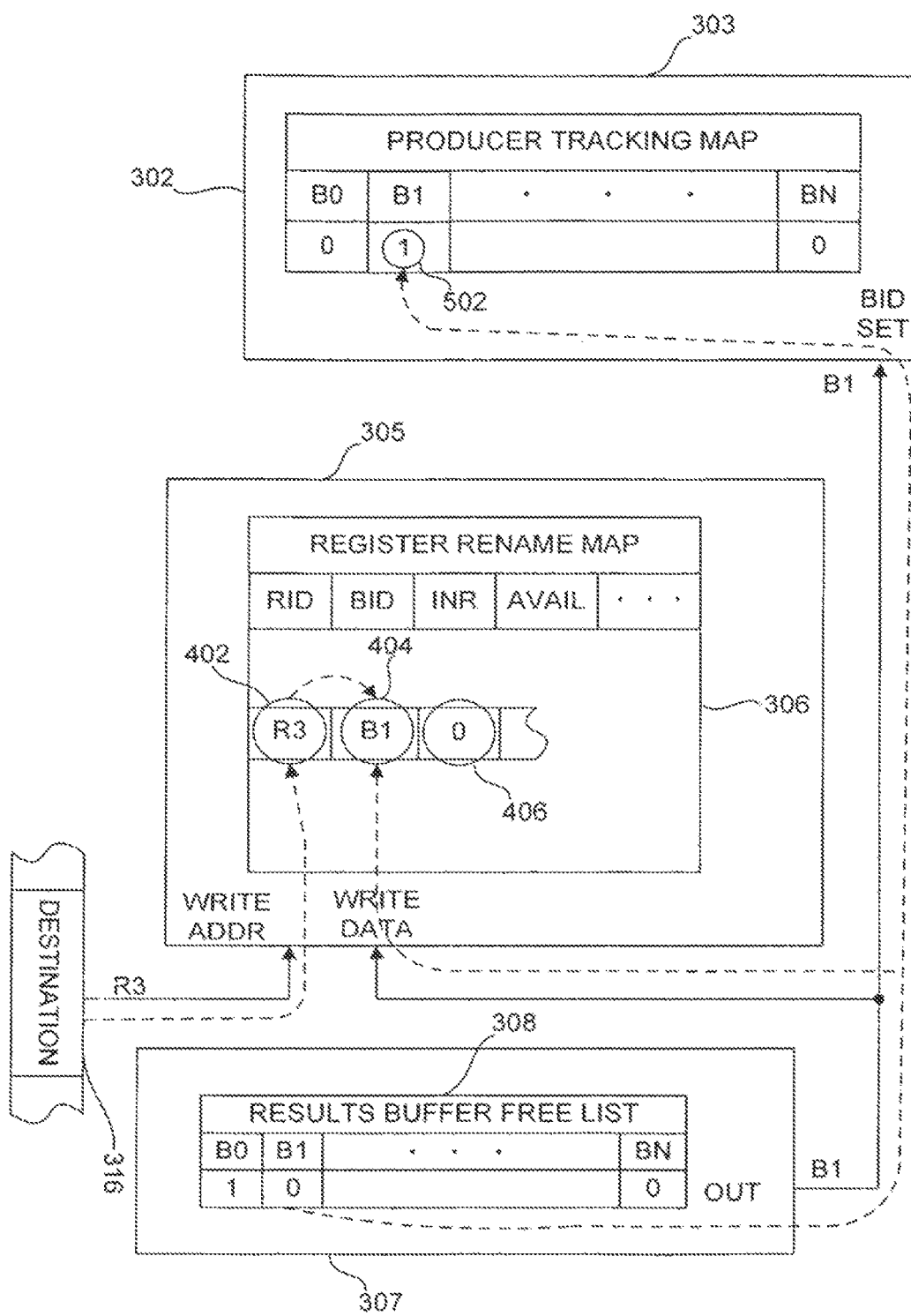
FIG. 5 is a diagram that illustrates setting a status bit of a producer tracking map and updating a register rename map according to an embodiment of the present invention.

FIG. 5 is a diagram that illustrates how a BID value output by results buffer allocater circuit 307 is used to set a producer tracking status bit of producer tracking map 303 and to update register rename map 306 according to an embodiment of the present invention. As noted herein, the function of results buffer allocater circuit 307 and results buffer free list 308 is to identify which physical registers of the results buffer are available to store a value produced by an instruction and to allocate an available physical register to an instruction that produces a value, for example, during instruction decode.

In the embodiment shown in FIG. 5, the example ADD instruction includes bits 316, which indicate that the resultant value of the ADD instruction is to be written to logical/architectural state register R3. Before this happens, however, the resultant value will first be temporarily stored in a physical register of results buffer 218. Thus, results buffer allocater circuit 307 must identify a physical register that is available and communicate this information to operand renamer circuit 305.

As illustrated in FIG. 5, results buffer free list 308 show a "1 bit" associated with physical register B0. In an embodiment, the "1 bit" indicates that physical register B0 is currently assigned to an instruction that has not yet graduated, and thus physical register B0 is unavailable. Results buffer free list 308 show a "0 bit" associated with physical register B1. The "0 bit" indicates physical register B1 is available, and thus results buffer allocater circuit 307 outputs bits (e.g., a BID value) that are used to represent/identify physical register B1. The "0 bit" associated with physical register B1 is then set to "1" to indicate that physical register B1 is no longer available.

The BID value output by results buffer allocater circuit 307 is communicated to producer tracking circuit 302. In an embodiment, the BID value is placed on a BID set bus, which causes a bit stored at location 502 in producer tracking map 303 to be set to a value of one. A value of one indicates that the instruction associated with physical register B1 is the latest producer of a data value (e.g., the resultant value of the ADD instruction that will be written to register R3 of register file 114 upon graduation of the ADD instruction). A value of zero stored in producer tracking map 303, which is indexed for example by a BID value representing physical register B0, indicates that any instruction associated with physical register B0 is not the latest producer of a value. In an embodiment, during a cold reset of processor 100, all of the producer tracking status values of producer tracking map 303 are reset to zero.

The BID value output by results buffer allocater circuit 307 is also communicated to operand renamer circuit 305. As shown in FIG. 5, in an embodiment, the BID value is placed on a write data bus and written to location 404 of register rename map 305. Location 404 is selected for storing the BID value as a result of placing bits 316 on the write address bus of operand renamer circuit 305. The INR bit stored at location 406 of register rename map 306 is reset to zero to indicate that the resultant value of the ADD instruction is not yet available in register R3 of register file 114. As explained below, the zero bit stored at location 406 may or may not be set to one when the ADD instruction graduates.

Figure 6:
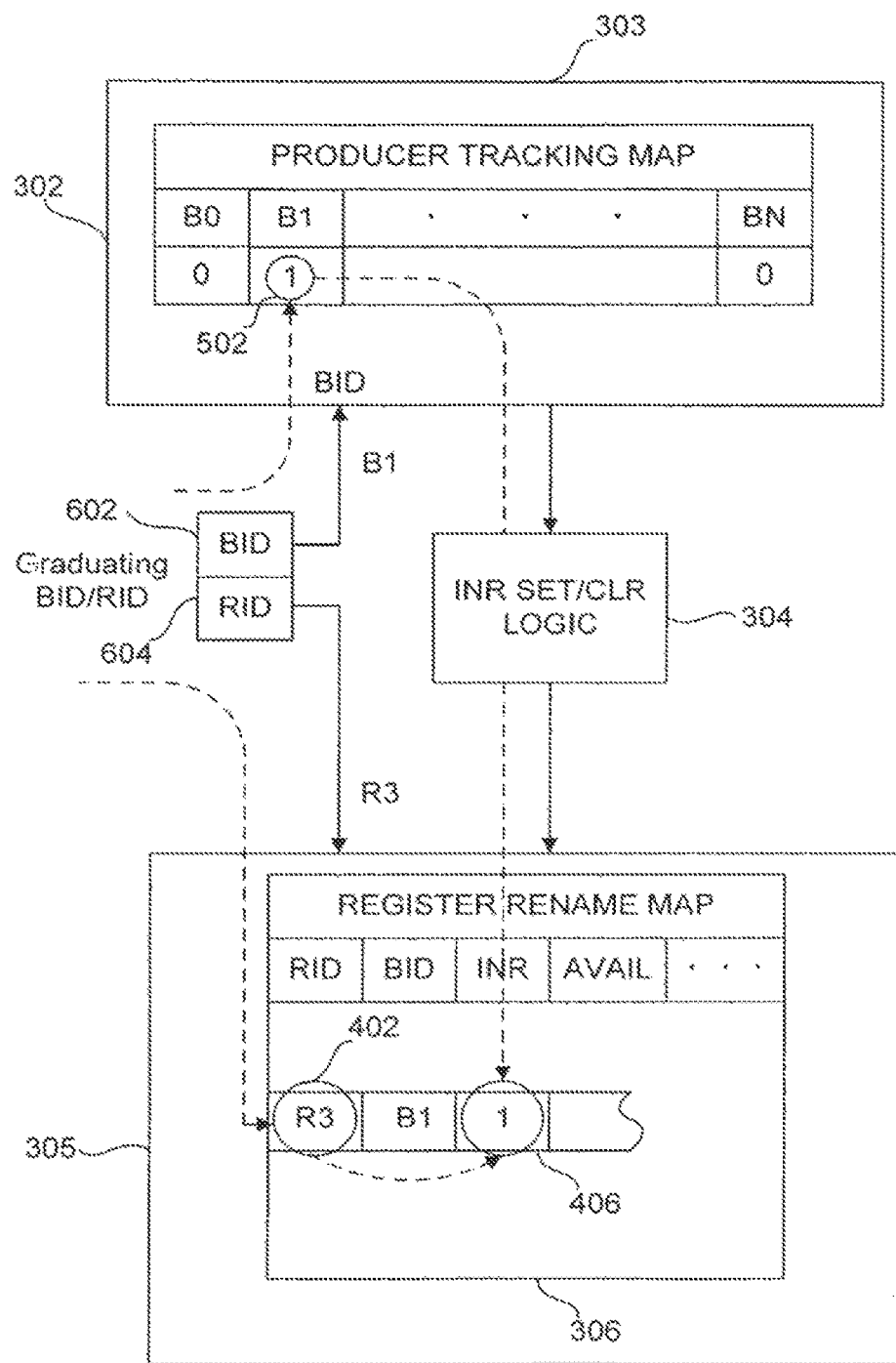
FIG. 6 is a diagram that illustrates updating a status bit of a register rename map according to an embodiment of the present invention.

FIG. 6 is a diagram that illustrates the updating of an INR status bit of register rename map 306 upon graduation of an instruction according to an embodiment of the present invention. In an out-of-order processor, instructions may be executed out-of-program-order, but all instructions graduate and update the architectural state of the processor in-program-order. This is accomplished, for example, by transferring data associated with instructions that are graduating in-program-order from the physical registers of results buffer 218 to the logical/architectural state registers of register file 114 as the instructions graduate.

When an instruction graduates, both the physical register and the logical/architectural state register associated with a producer instruction are known. Otherwise, the value produced by the instruction could not be transferred from the physical register of the results buffer to the logical/architectural state register of the register file. This information is shown in FIG. 6 as BID value 602 and RID value 604. During graduation of an instruction, BID value 602 is placed on a BID read bus of producer tracking circuit 302, and RID value 604 is placed on an RID read bus of operand renamer circuit 305.

As shown in FIG. 6, when BID value 602 is placed on the BID read bus of producer tracking circuit 302, a producer tracking status value stored in producer tracking map 303 (e.g., at location 502) associated with BID value 602 is provided to IR SET/CLR logic 304. If the producer tracking value provided to INR SET/CLR logic 304 indicates that the graduating instruction is the latest producer of a data value, INR SET/CLR logic 304 modifies the INR status value (e.g., at location 406) in register rename map 306 indexed by RID value 604 (e.g., index 402) to indicate that the data value is now available in register file 114 (e.g., in register R3). If the producer tracking value provided to INR SET/CLR logic 304, however, indicates that the instruction associated with the graduating instruction is not the latest producer of a data value, the INR status value is not modified to indicate that the data value is available in register file 114. This feature of the present invention is described further below with reference to FIG. 7.

FIG. 7 is a diagram that further illustrates operation of processor 100 according to an embodiment of the present invention. FIG. 7 shows how values stored in register rename map 306 and producer tracking map 303 are modified based on two ADD instructions over six time periods. The time periods each represent multiple processor clock cycles, as can be understood by comparing for example FIG. 2 and FIG. 7, in order to simplify the description.

As shown in FIG. 7, at a time period $T_0$, a first ADD instruction (ADD-1) is fetched from instruction cache 104. Instruction ADD-1 implements the function "R3=R1+R2". As shown in register rename map 306, at time period $T_0$, operand R1 is available in register R1 of register file 114 (i.e., the INR status bit equals one). Operand R2 is also available in register R2 of register file 114 (i.e., the INR status bit equals one). The next physical register available to store the resultant value produced by instruction ADD-1 is assumed to be physical register B1. None of the physical registers illustrated in producer tracking map 303 are being used by an instruction that is the latest producer of a data value (i.e., all of the shown producer tracking status values are zero).

At a time period T1, instruction ADD-1 is undergoing decoding and operand renaming. As shown in the register rename map of FIG. 7, for time period $T_1$, no operand renaming is required for source 1 and source 2 of the instruction.

During time period $T_1$, results buffer allocater circuit 307 allocates physical register B1 to store the resultant value of instruction ADD-1 until such time as instruction ADD-1 graduates. How this is accomplished is shown, for example, in FIG. 5. The BID value associated with physical register B1 replaces the BID value associated with physical register B12 in register rename map 306. The appropriate INR status value is also reset to zero. In addition, the producer tracking status value for physical register B1 in producer tracking map 303 is set to one to indicate the instruction writing to physical register B1 is the latest producer of the value that will be written to register R3.

At a time period $T_2$, instruction ADD-1 is executed and generates a resultant value that is stored in physical register B1. Also during time period $T_2$, a second ADD instruction (ADD-2) is fetched from instruction cache 104. Instruction ADD-2 implements the function "R3=R1+R4". As shown in register rename map 306, operand R1 and operand R2 are available in register R1 and register R2, respectfully, of register file 114. The next physical register available to store the resultant value produced by instruction ADD-2 is assumed to be physical register B4.

During a time period $T_3$, instruction ADD-2 is undergoing decoding and operand renaming. Results buffer allocater circuit 307 allocates physical register B4 to store the resultant value of instruction ADD-2 until such time as instruction ADD-2 graduates. As a result, the BID value associated with physical register B4 replaces the BID value associated with physical register B1 in register rename map 306. The appropriate INR status value is again reset to zero. Furthermore, the producer tracking status value for physical register B1 in producer tracking map 303 is set to zero, and the producer tracking status value for physical register B4 is set to one to indicate that the instruction writing to physical register B4 (i.e., ADD-2) is now the latest producer of the value that will be written to register R3.

As shown in FIG. 7, instruction ADD-1 graduates during time period $T_3$. During this period of time, the data value stored in physical register B1 is written to logical/architectural register R3. Also, in an embodiment of the present invention, as illustrated for example in FIG. 6, the BID value "B1" is placed on the BID read bus of producer tracking circuit 302. This causes the producer tracking status value "0" that is stored in producer tracking map 303 and associated with BID value "B1" to be provided to INR SET/CLR logic 304. Because the producer tracking status value "0" provided to INR SET/CLR logic 304 indicates that the graduating instruction (ADD-1) is not the latest producer of the data value that will be written to register R3, INR SET/CLR logic 304 does not modify the INR status value for register R3 in register rename map 306 to indicate that the data value is available in register file 114. If this were to occur, subsequent instructions would use the value stored in register R3 rather than the latest value stored in physical register B4 by instruction ADD-2.

During a time period $T_4$, instruction ADD-2 is executed and generates a resultant value that is stored in physical register B4.

During a time period $T_5$, instruction ADD-2 graduates. During this period of time, the data value stored in physical register B4 is written to logical/architectural register R3. This is accomplished as shown, for example, in FIG. 6. As described herein, the BID value "B4" is placed on the BID read bus of producer tracking circuit 302. This causes the producer tracking status value "1" that is stored in producer tracking map 303 and associated with BID value "B4" to be provided to INR SET/CLR logic 304. Because the producer tracking status value "1" provided to INR SET/CLR logic 304 indicates that the graduating instruction (ADD-2) is the latest producer of the data value that will be written to register R3, INR SET/CLR logic 304 modifies the INR status value for register R3 in register rename map 306 to indicate that the data value is now available in register file 114. In addition, the producer tracking status value for physical register B4 in producer tracking map 303 is set to zero.

Figure 8:
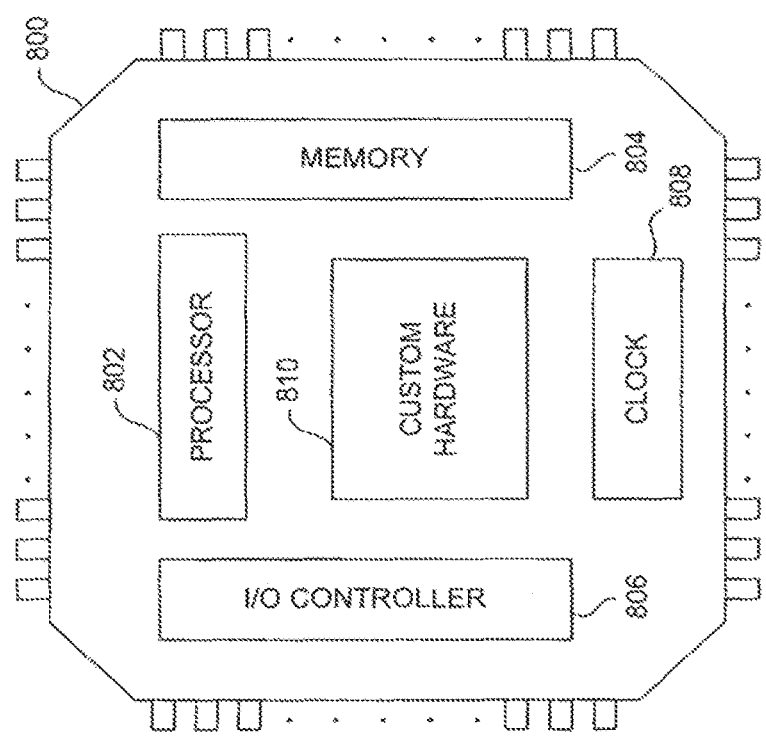
FIG. 8 is a diagram of an example system embodiment of the present invention.

FIG. 8 is a diagram of an example system 800 according to an embodiment of the present invention. System 800 includes a processor 802, a memory 804, an input/output (I/O) controller 806, a clock 808, and custom hardware 810. In an embodiment, system 800 is an application specific integrated circuit (ASIC) or a system on a chip (SOC).

Processor 802 is any processor that includes features of the present invention described herein and/or implements a method embodiment of the present invention. In one embodiment, processor 802 includes an instruction fetch unit, an instruction cache, an instruction decode and dispatch unit, one or more instruction execution unit(s), a data cache, an instruction graduation unit, a register file, and a bus interface unit similar to processor 100 described above.

Memory 804 can be any memory capable of storing instructions and/or data. Memory 804 can include, for example, random access memory and/or read-only memory.

Input/output (I/O) controller 806 is used to enable components of system 800 to receive and/or send information to peripheral devices. I/O controller 806 can include, for example, an analog-to-digital converter and/or a digital-to-analog converter.

Clock 808 is used to determine when sequential subsystems of system 800 change state. For example, each time a clock signal of clock 808 ticks, state registers of system 800 capture signals generated by combinatorial logic. In an embodiment, the clock signal of clock 808 can be varied. The clock signal can also be divided, for example, before it is provided to selected components of system 800.

Custom hardware 810 is any hardware added to system 800 to tailor system 800 to a specific application. Custom hardware 810 can include, for example, hardware needed to decode audio and/or video signals, accelerate graphics operations, and/or implement a smart sensor. Persons skilled in the relevant arts will understand how to implement custom hardware 810 to tailor system 800 to a specific application.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

The invention claimed is:

1. A hardware processor comprising:
   an operand renamer circuit that stores a plurality of in-register status values, wherein each in-register status value is based on an availability of a data value in a particular architectural state register;
   a producer tracking circuit that stores a plurality of producer tracking status values, wherein each producer tracking status value is associated with a particular physical register of one or more physical registers and is used to identify if the particular physical register is being used by an instruction to store a latest data prior to the data being transferred to an architectural state register;
   a results buffer allocater circuit, having a results buffer free list, that sends a signal to the producer tracking circuit to modify a respective producer tracking status value of the one or more physical registers; and
   control logic that modifies, upon graduation of an instruction, an in-register status value associated with the instruction, based on an architectural state register graduation value received at the operand renamer circuit and the producer tracking status value associated with the graduated instruction provided to the control logic in response to a physical register graduation value received at the producer tracking circuit.

2. The hardware processor of claim 1, wherein the plurality of in-register status values are used to determine if a particular data value is available in the architectural state register or in a physical register.

3. The hardware processor of claim 1, wherein values stored in a register rename map are accessed using architectural state register identification values.

4. The hardware processor of claim 1, wherein the producer tracking circuit includes a producer tracking map.

5. The hardware processor of claim 4, wherein values stored in the producer tracking map are accessed using physical register identification values.

6. The hardware processor of claim 1, wherein each producer tracking status value consists of a single bit.

7. The hardware processor of claim 1, wherein the operand renamer circuit sends a signal to the producer tracking circuit to modify a particular producer tracking status value.

8. A system, comprising:
   a hardware processor that includes an operand renamer circuit that stores a plurality of in-register status values, wherein each in-register status value is based on an availability of a data value in a particular architectural state register;
   a producer tracking circuit that stores a plurality of producer tracking status values, wherein each producer tracking status value is associated with a particular physical register of one or more physical registers and is used to identify if the particular physical register is being used by an instruction to store a latest data prior to the data being transferred to an architectural state register;
   a results buffer allocater circuit, having a results buffer free list, that sends a signal to the producer tracking circuit to modify a respective producer tracking status value of the one or more physical registers;
   control logic that modifies, upon graduation of an instruction, an in-register status value associated with the instruction, wherein the control logic modifies the in-register status value based on an architectural state register graduation value received at the operand renamer circuit and a stored producer tracking status value associated with the instructions provided to the control logic in response to a physical register graduation value received at the producer tracking circuit; and
   memory coupled to the processor.

9. The system of claim 8, wherein the plurality of in-register status values are used to determine if a particular data value is available in the architectural state register or in a physical register.

10. The system of claim 8, wherein the producer tracking circuit includes a producer tracking map.

11. The system of claim 8, wherein the operand renamer circuit sends a signal to the producer tracking circuit to modify a particular producer tracking status value.

12. A non-transitory computer readable storage medium having embodied thereon computer-readable program code for generating a processor, the computer-readable program code comprising:
   computer-readable code to generate an operand renamer circuit that stores a plurality of in-register status values, wherein each in-register status value is based on an availability of a data value in a particular architectural state register;
   computer-readable code to generate a producer tracking circuit that stores a plurality of producer tracking status values, wherein each producer tracking status value is associated with a particular physical register of one or more physical registers and is used to identify if the particular physical register is being used by an instruction to store a latest data prior to the data being transferred to an architectural state register;

computer-readable program code to generate a results buffer allocater circuit having a results buffer free list, wherein the results buffer allocater circuit sends a signal to the producer tracking circuit to modify a respective producer tracking status value of the one or more physical registers; and computer-readable code to generate control logic that modifies, upon graduation of an instruction, an in-register status value associated with the instruction, wherein the control logic modifies the in-register status value based on an architectural state register graduation value received at the operand renamer circuit and a stored producer tracking status value associated with the instruction provided to the control logic in response to a physical register graduation value received at the producer tracking circuit.

13. The non-transitory computer readable storage medium of claim 12, wherein the plurality of in-register status values are used to determine if a particular data value is available in the architectural state register or in a physical register.

14. The non-transitory computer readable storage medium of claim 12, wherein the computer-readable program code configures the generated producer tracking circuit to include a producer tracking map.

15. The non-transitory computer readable storage medium of claim 12, wherein the computer-readable program code configures the generated operand renamer circuit to send a signal to the producer tracking circuit to modify a particular producer tracking status value.

16. The non-transitory computer readable storage medium of claim 12, wherein the computer-readable program code configures the processor in hardware description language software.

17. The non-transitory computer readable storage medium of claim 16, wherein the computer-readable program code configures the processor in one of Verilog hardware description language software and VHDL hardware description language software.

* * * * *